United States Patent [19]

Hufnagel

[11] Patent Number: 4,878,618

[45] Date of Patent: Nov. 7, 1989

[54] WEAR RESISTANT, SELF-DAMPING CLAMP ASSEMBLY

[75] Inventor: Nick L. Hufnagel, Tequesta, Fla.

[73] Assignee: United Technologies Corporation, Hartford, Conn.

[21] Appl. No.: 281,162

[22] Filed: Dec. 8, 1988

[51] Int. Cl.⁴ .............................................. F01K 1/12
[52] U.S. Cl. ............................................... 239/265.39
[58] Field of Search ..................... 239/265.37, 265.39

[56] References Cited

U.S. PATENT DOCUMENTS 3,972,475  8/1976  Nelson et al. ................... 239/127.3
4,128,208 12/1978  Ryan et al. ..................... 239/265.39
4,171,093 10/1979  Honeycutt Jr. et al. ...... 239/265.39

Primary Examiner—Andres Kashnikow
Assistant Examiner—Karen B. Merritt
Attorney, Agent, or Firm—Troxell K. Snyder

[57] ABSTRACT

A clamp assembly (32) for securing an elongated seal (30) between adjacent hinged flaps (12) includes a wear-plate (60) and a bridge clamp (54). The wear plate includes a pair of integral tabs (64) for engaging a threaded mounting plate (35) for providing antirotation between the plate (60) and the seal (30). The wear plate (60) also includes at least two ears (68) disposed on opposite sides of one of the arms (70, 72) of the bridge clamp (54) to prevent rotation between the clamp (54) and plate (60).

7 Claims, 3 Drawing Sheets

[4,878,618]

WEAR RESISTANT, SELF-DAMPING CLAMP ASSEMBLY

This invention was made with government support under a contract awarded by the Department of the Air Force. The government has certain rights in this invention.

FIELD OF THE INVENTION

The present invention relates to a clamp for securing a linear seal in an exhaust nozzle of a gas turbine engine, or the like.

BACKGROUND

Axisymmetric variable flow area exhaust nozzles for gas turbine engines typically comprise a plurality of individual flaps arranged circumferentially to define a divergent exhaust duct. Each flap is hinged at the forward end, with the trailing edge movable radially for establishing a selected exhaust duct configuration. A plurality of elongated gas seals are disposed circumferentially between the hinged flaps, with a portion of each seal disposed within the exhaust duct for spanning the varying gap between adjacent flaps, and secured in place by one or more clamp components which lie outside of the duct and contact the radially outward facing surfaces of the sealed adjacent flaps.

The clamps hold the linear seal radially while allowing the seal and adjacent flaps to slide relative to each other as the nozzle is reconfigured between divergent to convergent configurations. Such clamps are therefore subject not only to repeated stress cycling depending on the flow regime of the exhaust gases within the duct, but also experience frictional wear at the surfaces which contact the respective nozzle flaps.

Prior art one piece clamp components, secured to a threaded stud and mounting plate extending from a longitudinal stiffening rib in the radially outward side of the seal include an antirotation channel welded to the clamp and engaging the mounting plate to prevent rotation of the clamp about the central securing stud. This has proved unsatisfactory during extended use cycling as the localized depletion of material properties near the weld site reduces the resistance to cracking due to fatigue. Cracking initiated adjacent the weld site can result in complete separation of a portion of the clamp and loss of effectiveness in securing the elongated flap seal.

Rubbing between the clamp and radially outer flap surfaces causes wearing of the clamp, requiring replacement of the entire component. Hardfacing of the contacting surfaces reduces the frequency of replacement, but adds additional cost to the clamp fabrication.

A third problem with the prior art one piece design occurs during periods of nozzle operation wherein a rapidly fluctuating internal duct pressure occurred. Should such pressure fluctuation coincide with the natural frequency of the one piece clamp, the clamp component will begin to vibrate rapidly, increasing frictional wear and inducing a high cycle material fatigue in the clamp structure. What is needed is a clamp assembly resistant to frictional wearing, which includes a non-welded antirotation means, and which has internal damping to avoid vibration during periods of fluctuating duct pressure.

SUMMARY OF THE INVENTION

It is therefore an object of the present invention to provide a clamp for holding an elongated, interflap seal in a variable area exhaust nozzle.

It is further an object of the present invention to provide a clamp assembly which includes means for preventing rotation of the clamp assembly relative to the seal.

It is further an object of the present invention to provide a clamp assembly with increased wear resistance.

It is further an object of the present invention to provide a clamp assembly fabricated without welding.

It is still further an object of the present invention to provide an assembly which is self-damping.

According to the present invention, an elongated seal with a radially extending stiffening ridge is held in place between two forwardly hinged nozzle flaps by one or more clamp assemblies which extend circumferentially with respect to the exhaust nozzle and which are secured to the seal ridge by a projecting threaded stud or the like. The clamp assembly according to the present invention is formed of two components each fabricated from stamped sheet metal, a first, stiffened bridge clamp and a second, resilient wear plate. The plate is disposed between the bridge clamp and the nozzle flaps and includes wear resistant materials or coatings at the surface contact area. Also included in the wear plate is an antirotation tab extending radially inward for receiving the mounting plate.

The wear plate further includes a pair of radially outwardly extending ears, disposed on either side of the bridge clamp, for preventing relative rotation between the two components of the clamp assembly. Unlike prior art seal clamps which required welding of an antirotation plate to the circumferentially central portion, the assembly according to the present invention avoids any welding or localized materials heating, thus providing predictable materials properties and enhanced resistance to fatigue.

The two piece design of the clamp assembly of the present invention provides the additional feature of frictional self-damping. As the two piece clamp flexes under cyclical loading, the wear plate and bridge clamp rub circumferentially, absorbing the energy of the vibratory motion and attenuating its magnitude. The self-damping feature is accomplished by shaping the wear plate to be spaced apart from the bridge clamp when the assembly is unsecured to the ridge stud, thereby achieving a spring bias when the assembly is secured to the seal. The internal spring bias and frictional damping reduces the resonant amplitude of the assembled seal clamp and eliminates high cycle stress fatigue failures in the assembly.

Both these and other objects and advantages of the seal clamp assembly according to the present invention will be apparent to those skilled in the art upon review of the following specification and the appended claims and drawing figures.

DETAILED DESCRIPTION OF THE PREFERRED EMBODIMENT

Figure 1:
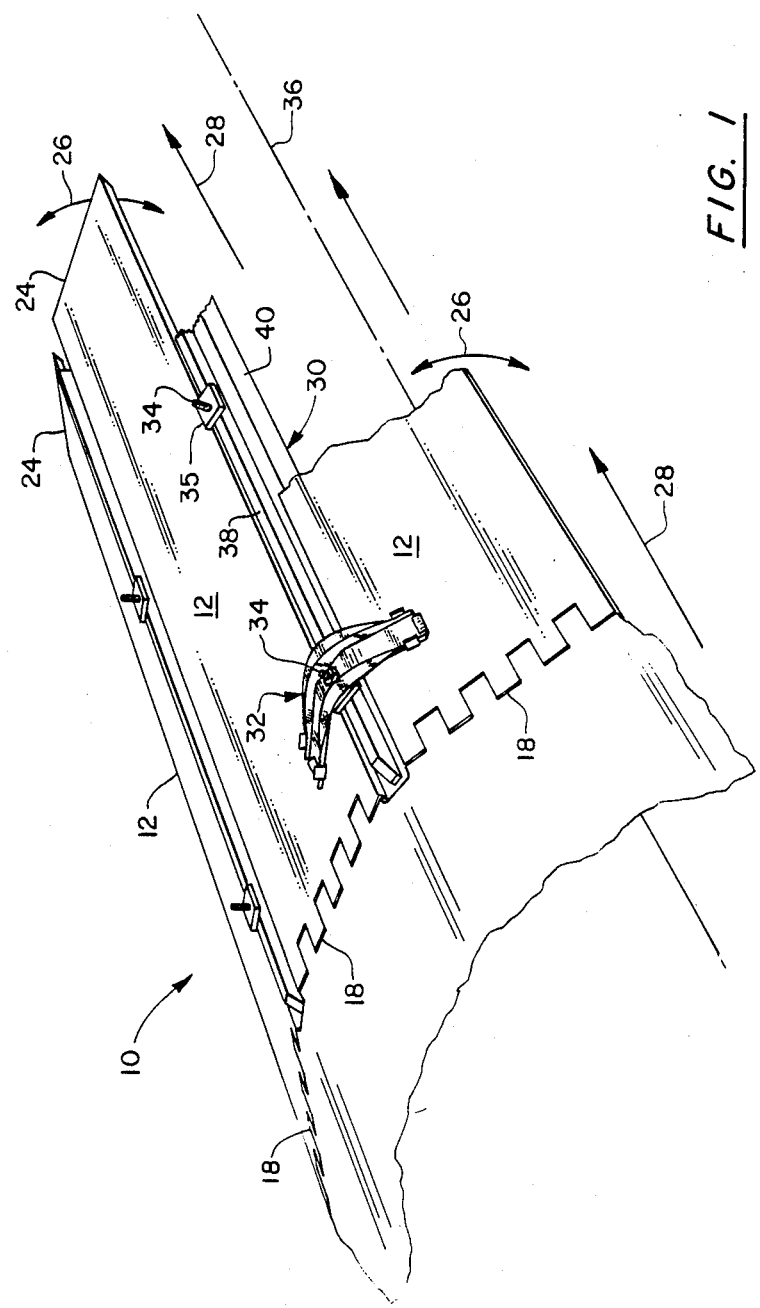
FIG. 1 shows a perspective view of the environment of the invention in an exhaust nozzle.

FIG. 1 shows a view of a portion of an axisymmetric, variable area exhaust nozzle for an aircraft gas turbine engine, or the like. The nozzle includes an exhaust duct 10 defined by a plurality of hinged flaps 12, which are supported at the forward edge thereof by corresponding hinges 18. The flaps are pivoted 26 about their respective hinges 18 so as to force the trailing edges 24 of the flaps 12 radially inward and outward 26 thereby achieving a variable configuration exhaust duct 10. The duct may be convergent, divergent, or straight sided, depending on the orientation of the flaps 12.

As is apparent from FIG. 1, the flaps 12 have a longitudinally extending gap therebetween which must be sealed to confine the nozzle exhaust gases 28 for achieving proper nozzle operation. Hence, an elongated seal 30 is disposed between adjacent flaps 12 and secured by one or more clamp assemblies 32 according to the present invention. The clamp assembly 32 is, in the preferred embodiment, secured to a mounting plate 35 and threaded stud 34 extending radially outward with respect to the nozzle axis 36, both of which are secured to an elongated stiffening ridge 38 which extends radially outward from the gas contacting portion 40 of the seal 30. It should be apparent that the flaps 12 define a variable circumferential separation as they pivot about their respective hinges 18. Thus, the clamp assemblies 32 experience circumferential sliding as they retain the seal 30 between the moving flaps 12

Figure 2:
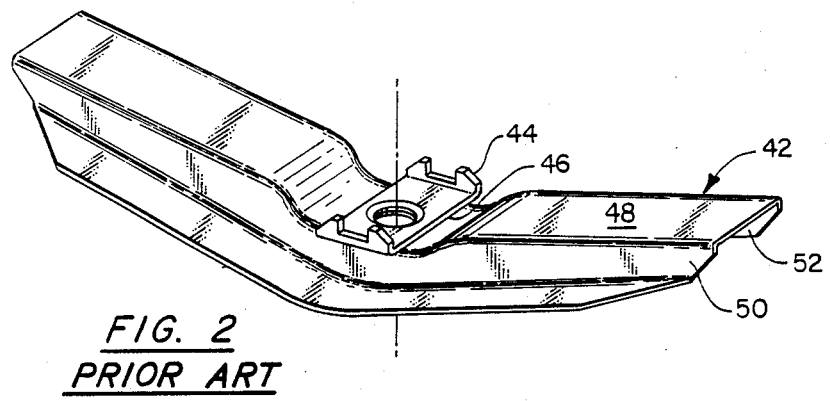
FIG. 2 shows a view of a prior art clamp component.

FIG. 2 shows a prior art clamp which is fabricated of a single stamped sheet of material with an additional antirotation plate 44 welded 46 to the radially inward surface 48 thereof. The prior art clamp 42 is shaped to have a stiff cross section, including radially extending web portions 50, 52. As noted in the preceding background section, the weld 46 securing the antirotation plate 44 to the clamp 42 depletes the strength of the clamp 42 locally, increasing the likelihood that a crack may form in the clamp 42 as it experiences repeated bending stress as a result of the forces imposed on the seal 30.

Figure 3A:
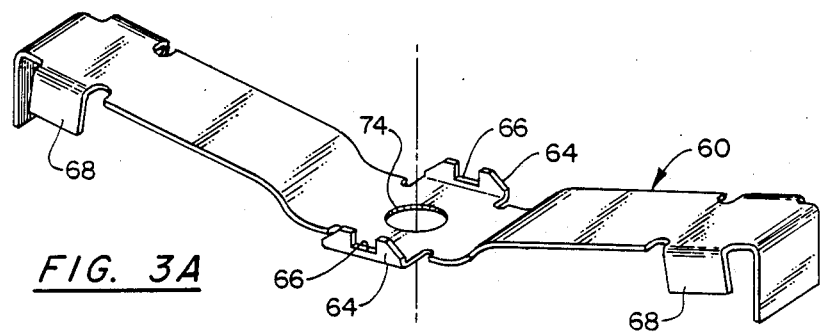
FIGS. 3a and 3b show views of the bridge clamp component and wear plate component of the clamp assembly according to the present invention.
Figure 3B:
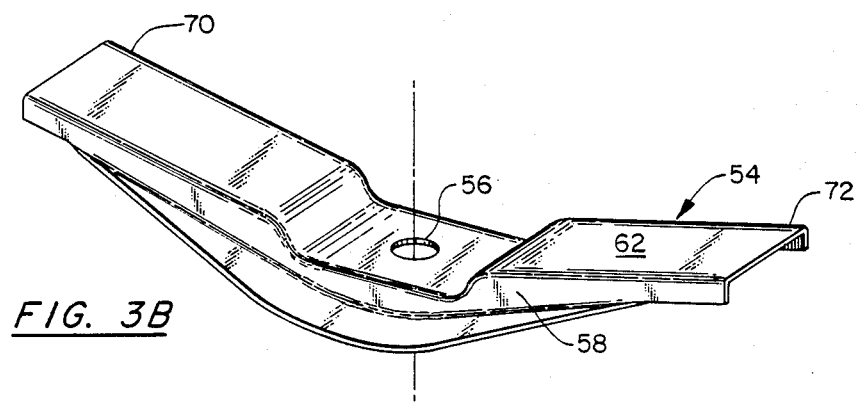

FIGS. 3a and 3b show the components of the clamp assembly according to the present invention. FIG. 3b shows the bridge clamp component 54, which is basically similar to the prior art clamp 42 except that it does not itself include antirotation means for maintaining the orientation of the clamp assembly with respect to the seal 30. The bridge clamp 54 includes a hole 56 for receiving the mounting stud 34, as well as web portions 58 as in the prior art clamp.

FIG. 3a shows the second component of the clamp assembly, being a wear plate 60 formed of resilient sheet material which is stamped to conform generally to the radially inner surface 62 of the bridge clamp 54. The wear plate 60 includes two antirotation tabs 64 disposed in the central portion of the plate 60 for engaging the mounting plate 35 and preventing relative rotation between the seal 30 and plate 60. Each tab 64 also includes a notch 66 for receiving the seal ridge 38. The wear plate 60, disposed between the bridge clamp 54 and the adjacent flaps 12, protects the bridge clamp 54 from wear thereby reducing fretting of the structural component of the clamp assembly 32. Antirotation between the wear plate 60 and the bridge clamp 54 is provided by a plurality of radially outwardly extending ears 68 disposed at opposite ends of the wear plate 60 and, when assembled, lying on opposite sides of the circumferentially extending arms 70, 72 of the bridge clamp 54. A central opening 74 for receiving the mounting stud 34 completes the functional description of the features of the wear plate 60.

Figure 4:
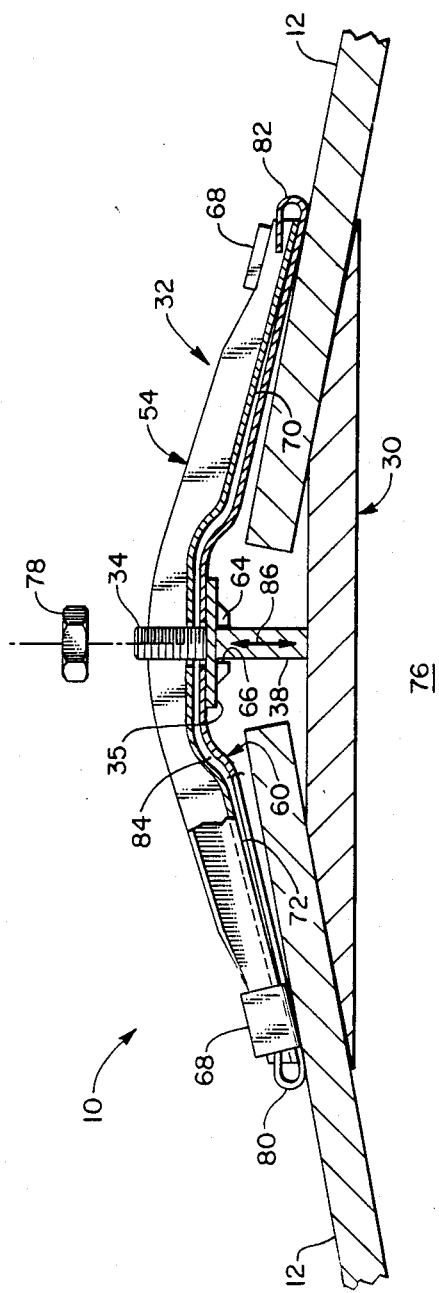
FIG. 4 shows a view of the clamp assembly according to the present invention as it would appear during installation in an exhaust nozzle.

FIG. 4 shows a view taken in a radial section of the clamp assembly 32 according to the present invention as installed in a nozzle. FIG. 4 shows circumferentially adjacent flaps 12 having the elongated seal 30 disposed therebetween. The raised ridge 38 of the seal extends both longitudinally and radially outward with respect to the interior 76 of the gas duct 10. The bridge clamp 54 and wear plate 60 are positioned over the securing stud 34 which includes a threaded nut 78 for clamping the assembly 32 securely to the seal 30. The tabs 64 engage the studded mounting plate 35 for preventing rotation of the wear plate 60, with the radially extending ears 68 disposed on opposite sides of the circumferentially extending arms 70, 72 of the bridge clamp 54.

Another feature of the assembly 32 according to the present invention is provided by securing flaps 80, 82 formed in the wear plate 60 and bent backward over the opposite ends of the bridge clamp 54 for retaining the wear plate 60 when the assembly 32 is not secured to the seal 30. Such flaps 80, 82 are optional, being provided only for convenience as the assembly 32 is secured to the seal 30.

One other feature of the assembly 32 according to the present invention which will become apparent to those skilled in the art is the ability to provide internal damping as the assembly 32 is subject to varying pressure fluctuations within the duct interior 76. As noted in FIG. 4, the wear plate 60 is configured so as to leave a gap 84 between the bridge clamp 54 and the wear plate 60 before the assembly 32 is secured to the seal 30 by the stud 34 and nut 78. When the nut 78 is firmly torqued onto the threaded stud 34, the resilient wear plate 60 is compressed against the bridge clamp 54, thereby creating an internal spring bias which provides a normal surface force for the frictional rubbing which occurs between the bridge clamp 54 and the wear plate 60 as the assembly 32 flexes under the influence of the vibrating force 86 resulting from the internal pressure fluctuations within the duct 10. The relative movement of the plate 60 and bridge clamp 54 creates frictional energy dissipation, damping the clamp assembly 32, attenuating any resonance vibration and further reducing the likelihood of high cycle fatigue in the assembly 32.

Although disclosed in terms of the preferred embodiment shown in the accompanying drawing figures as explained in the preceding specification, it will be appreciated by those skilled in the art that the clamp assembly according to the present invention may be achieved by a variety of equivalent structures and arrangements, thus such disclosure must be interpreted as illustrative of one such embodiment, with the true scope of the invention limited only by the text of the claims presented hereinbelow.

I claim:

1. A clamp assembly for securing an elongated seal between first and second forwardly hinged exhaust nozzle flaps, the elongated seal including a stiffening ridge extending from the seal between the flaps, wherein the clamp assembly comprises:

a bridge clamp having a pair of circumferentially extending arms, one of said arms extending circumferentially over a portion of the first flap, and the other of said arms extending circumferentially over a portion of the second flap;

a wear plate, disposed intermediate the bridge clamp and the first and second flaps, the wear plate including a first antirotation means engaged with the elongated seal, and a second antirotation means engaged with the bridge clamp; and means, disposed between the elongated seal and the bridge clamp, for securing the bridge clamp and wear plate to the elongated seal.

2. The assembly as recited in Claim 1, wherein the wear plate is fabricated from sheet metal, and wherein the first antirotation means comprises a first tab portion bent toward the seal and engaged therewith.

3. The assembly as recited in Claim 2 wherein the first tab portion engages a mounting plate secured to the seal ridge.

4. The assembly as recited in Claim 2 wherein the second antirotation means includes first and second radially outwardly extending ears, disposed adjacent the end of the one of the bridge clamp arms, said ears each further disposed on opposite axial sides of the one backing clamp arm.

5. The assembly as recited in Claim 1, wherein the wear plate is fabricated from a resilient sheet material, and wherein the free shape of the wear pate provides a radial gap between the central portion thereof and the bridge clamp when the clamp and plate are not secured by the securing means.

6. The assembly as recited in Claim 5 wherein the wear plate further includes first and second retainer flaps disposed at opposite ends of the plate, said flaps being bent over the ends of the first and second bridge clamp arms for holding the wear plate adjacent the bridge clamp, at least when the the bridge clamp and wear plate are unsecured to the elongated seal.

7. The assembly as recited in Claim 1, wherein the securing means includes a threaded stud projecting radially from the seal ridge, said stud passing through a hole disposed in the wear plate and a hole in the bridge clamp, and a nut, threadedly engaged with the radially outward end of the stud and engaged therewith for compressing the bridge clamp, wear plate, and seal ridge.

* * * * *